Patented June 25, 1946

2,402,902

UNITED STATES PATENT OFFICE 2,402,902

SUSPENSION FOR USE IN INOCULATING PLANTS WITH ERGOT

Ralph W. Lewis, East Lansing, Mich., assignor to Michigan State Board of Agriculture, East Lansing, Mich., a corporation of Michigan No Drawing. Application April 1, 1943, Serial No. 481,495

2 Claims. (Cl. 195—56)

This invention relates to the artificial infection of plants with the disease of ergot. More particularly the invention resides in a new inoculum for use in infecting plants with the disease.

Ergot is a fungus disease of certain grass plants, particularly rye. In plants infected with it, at least some of the seeds are replaced by ergot sclerotia, usually called "ergots." Ordinarily the disease is a menace to livestock, because if the sclerotia are eaten, what is known as "ergotism" is developed in the animals which consume the sclerotia. On the other hand, certain drugs are produced from the sclerotia which have definite therapeutic properties.

In the United States the disease is not particularly prevalent, principally because of unfavorable climatic conditions. Even where it occurs in such quantities as to make the plants or their seed unfit for use as feed, the percentage of infection is not usually sufficient to make it worthwhile to harvest the ergot sclerotia themselves. The separation of small quantities of the sclerotia from the harvested grain, or the hand picking of the sclerotia in the field, is not usually economically feasible.

Attempts have been made to propagate and disseminate ergot spores so as to produce a yield of ergot sclerotia that is profitable to harvest. Those attempts have not been successful from a commercial standpoint. The usual practice has been to provide a liquid spray containing the spores in suspension and spray the plants at the time of bloom. As each plant has many florets, each floret is open but a few hours, and the florets bloom at different times, the spraying must be done frequently over a period of several days.

In addition, the spore suspensions are made up from laboratory cultures which must be ready for use shortly before the plants are to be sprayed. Otherwise the percentage of germination of spores decreases to the point where the suspension becomes ineffective as an inoculating agent.

Accordingly, the principal object of the present invention is to provide an ergot spore suspension which materially increases the length of life of the spores, both in suspension and on the plants after they are sprayed.

Another object is to produce a spore suspension which can be prepared prior to the time it is to be used and maintained in an effective condition for a relatively long period.

Another object is to provide a spore suspension, which when sprayed on the plants, will attract insects.

Briefly, the invention comprises a suspension of ergot spores and hyphae in a relatively concentrated solution of sugar and water. Preferably the concentration is approximately 45% to 60% sugar by weight, but effective results have been attained with a percentage as low as 5% of sugar. A 5% sugar solution will prevent death of the spores upon desiccation, but will not inhibit germination. About 25% or more sugar is required to inhibit germination. Therefore the suspension, if made up long prior to use, should be of a concentration of at least 25% sugar. The solution can be diluted when ready for use to not less than 5% sugar. The suspension is sprayed on the plants when they come into bloom, and nature is then permitted to complete the cycle.

The higher concentration of sugar solution is particularly effective because it inhibits germination of the spores during the time they are kept in the suspension and thereby permits the suspension to be made up long before it is needed. It prolongs the life of the spores after they have been sprayed on the plants by preventing desiccation thereof. Also, after it has been sprayed on the plants it attracts insects which are important agents in the dissemination of the spores. The spores in the sticky solution adhere to the insects' legs and bodies and are introduced into uninfected florets as the insects move from floret to floret.

To prepare a suspension for use I first surface sterilize a number of ergot sclerotia by dipping them in alcohol momentarily and then permit them to dry. The sterilized sclerotia are next cut into relatively small pieces and the pieces are planted in small dishes containing a sterile agar medium composed of agar, potato broth and sugar. The dishes are kept covered at room temperature for a few days and during this time there grow out of the pieces of sclerotia a series of filaments known as hyphae.

After the filaments have developed to a certain extent, segments thereof are transmitted to a suitable container which is bacteriologically sealed and which contains organic matter upon which the fungus can grow. This organic matter may constitute moist kernels of various grains such as wheat, or agar jelly, or other types of vegetable matter. The containers are maintained in a sealed condition for two or four weeks or longer. During this time the number of ergot spores are multiplied many times.

After the spores have been permitted to develop for the period mentioned in the preceding paragraph, water is poured into the container and the mixture of water, organic matter and spores is vigorously shaken to free the spores from the organic matter. The mixture is then poured into a strainer, such as a 30 mesh screen, to remove large particles which might plug the sprayer when the suspension is used. The suspension of spores in water is then added to a concentrated sugar solution of such a strength that the resulting mixture of sugar, water and spores contains about 45% of sugar by weight. The resulting sugar solution is then ready for use. However, it may be maintained in this condition for a relatively long period, the extent of which has not been definitely determined.

When the plants such as rye upon which the solution is to be sprayed come into bloom, the field is sprayed with suitable spraying apparatus. The solution may be used at full strength, or it may be diluted with water to a concentration of not less than 5% of sugar. Preferably the spraying process is repeated three or four times at intervals of a few days, so as to infect florets which are late in coming into bloom.

Once the plants have been infected, the rest of the cycle in the development of the ergot sclerotia is a natural process. When the sclerotia have been fully developed they may be hand picked or may be harvested by the usual harvesting machinery, with the grain separator set to carry the sclerotia in with the grain rather than blow it out with the chaff and straw. Most of the sclerotia can be separated from the grain by screening through a coarse screen and then the remaining mixture of sclerotia and grain can be separated by hand.

Thus it will be seen that the invention provides a highly effective medium for artificially infecting plants with ergot.

The scope of the invention is indicated in the appended claims.

I claim:

1. An ergot spore suspension for storing a culture of ergot spores until used to inoculate plants with the disease of ergot consisting of ergot spores, ergot mycelium, commercially pure refined sugar and water, the sugar content of the suspension being at least 25% by weight.

2. The method of preparing an ergot spore suspension for use in infecting plants with the disease of ergot which consists of the following steps: first preparing a sterile culture of ergot, thereafter preparing from the culture an aqueous suspension of ergot spores, and subsequently adding a concentration of commercially pure refined sugar in an amount sufficient to bring the sugar concentration in the suspension to at least 25%.

RALPH W. LEWIS.